United States Patent [19]

Gumb et al.

[11] Patent Number: 5,121,427
[45] Date of Patent: Jun. 9, 1992

[54] TELEPHONE BASE MEMBERS AND SUPPORT MEMBERS

[75] Inventors: Beverley W. Gumb; Edward J. R. Foster, both of London, Canada

[73] Assignee: Northern Telecom Limited, Montreal, Canada

[21] Appl. No.: 497,272

[22] Filed: Mar. 22, 1990

[51] Int. Cl.⁵ .............................................. H04M 1/00
[52] U.S. Cl. .................................... 379/435; 379/419; 379/428; 379/441; 379/454; D14/142; D14/149; D14/150; D14/151
[58] Field of Search ............... 379/428, 434, 435, 436, 379/441, 447, 450, 454, 452; D14/142, 151, 150, 149, 140, 124

[56] References Cited

U.S. PATENT DOCUMENTS

| D. 303,526 | 9/1989 | Gordon | D14/151 |
| 4,515,998 | 5/1985 | Pinede et al. | 379/435 |
| 4,568,801 | 2/1986 | Gates et al. | 379/435 |
| 4,776,553 | 10/1988 | Kobayashi | 248/558 |
| 4,797,916 | 1/1989 | Kojima | 379/454 |
| 4,819,266 | 4/1989 | Awakowicz et al. | 379/454 |

FOREIGN PATENT DOCUMENTS 0248648 11/1986 Japan ................. 379/435

Primary Examiner—James L. Dwyer
Assistant Examiner—William Cumming
Attorney, Agent, or Firm—R. J. Austin

[57] ABSTRACT

A telephone base member and base support member combination in which there are two support members. The two support members may be assembled together and as an assembly may be mounted upon the base member. This arrangement provides a first angle of support for the base member upon a support surface. Alternatively, only one of the support members is mounted upon the base member. This arrangement provides for a different angle of support.

9 Claims, 6 Drawing Sheets

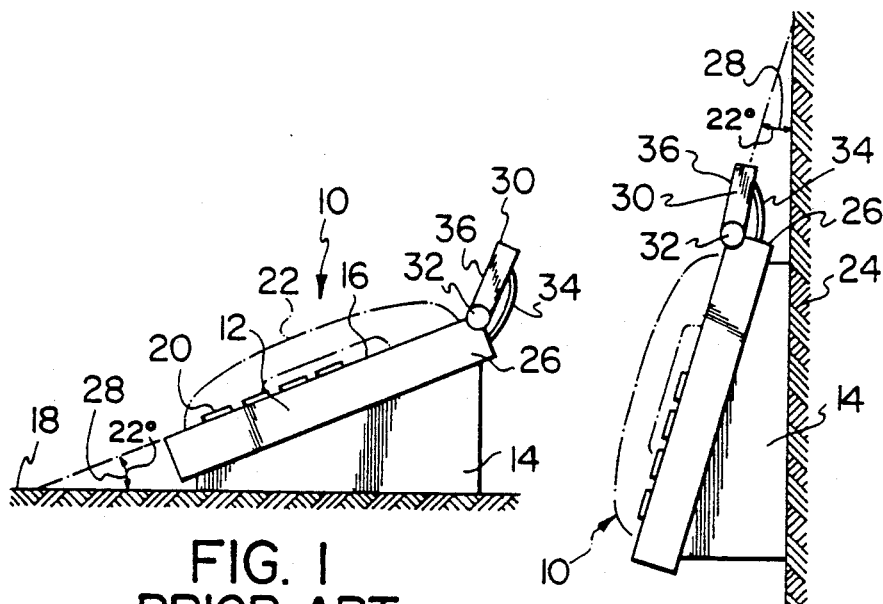
FIG. 1 PRIOR ART
FIG. 2 PRIOR ART
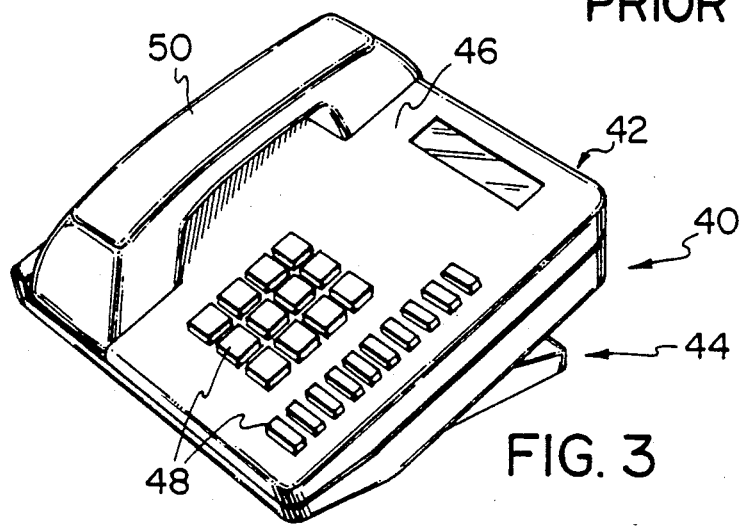
FIG. 3
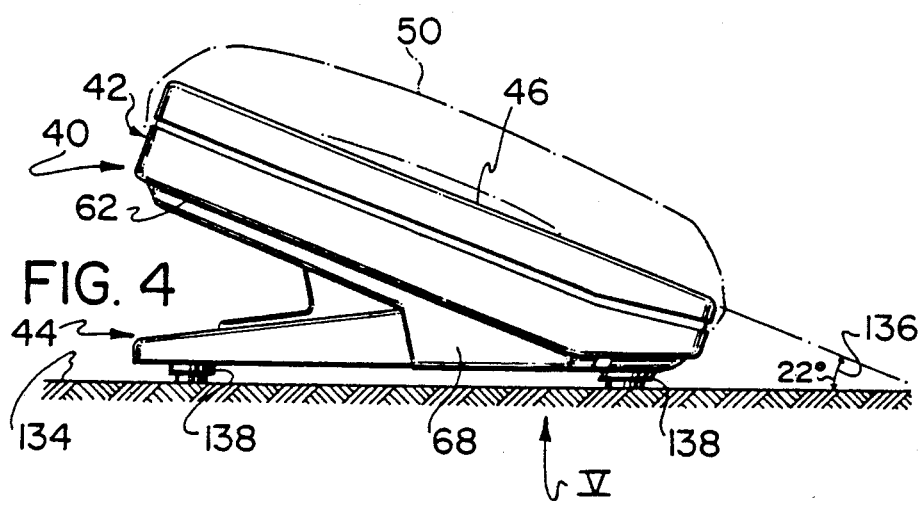
FIG. 4

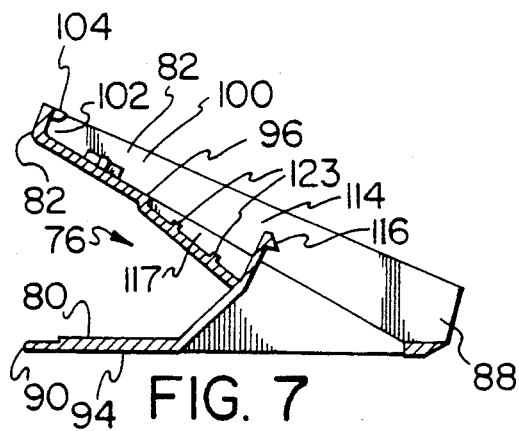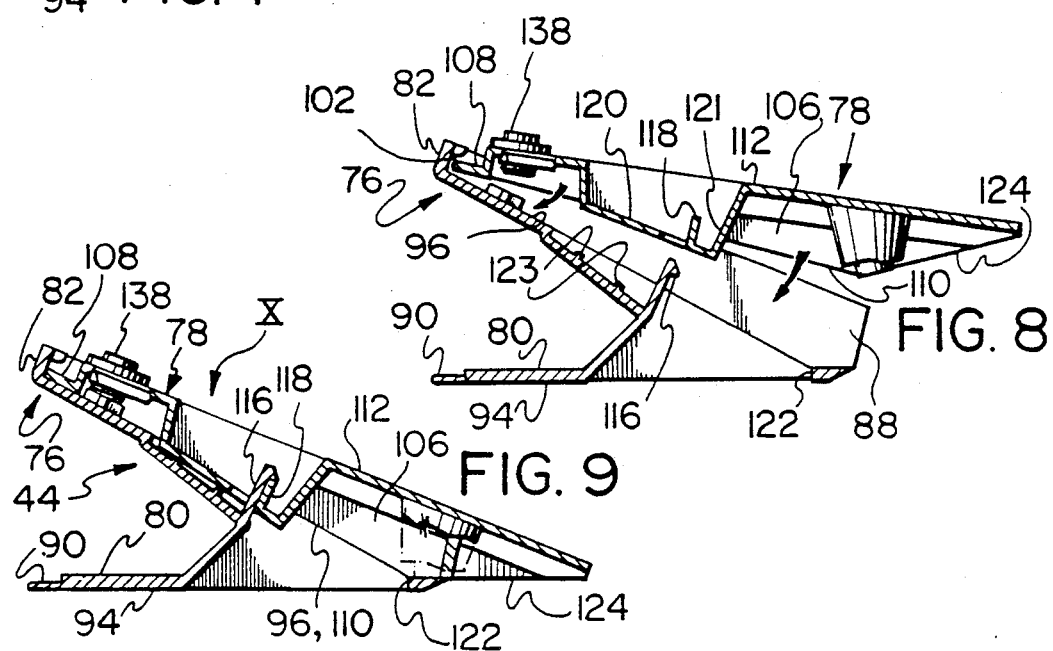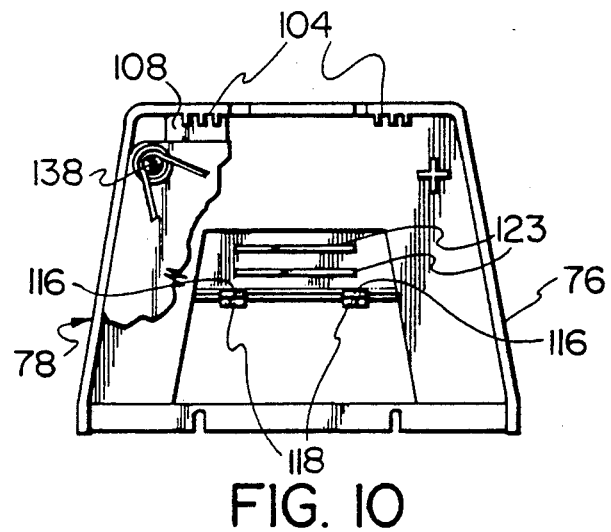

TELEPHONE BASE MEMBERS AND SUPPORT MEMBERS

BACKGROUND OF THE INVENTION

1. Field of the Invention

This invention relates to telephone base members and support members.

2. Description of Prior Art

It is conventional for a telephone base member to be supported upon a horizontal surface in such a way that the visual face of the base and which bears the dialing features, is orientated for the convenience of the user. Orientation considerations are also of prime importance when locating a telephone base member upon a vertical wall surface. It is now known to provide telephone base members for the dual function of being mountable either upon a horizontal or upon a vertical surface. As the normal angle of inclination of the visual face of a base member is different upon a horizontal surface than upon a vertical surface, to allow for the dual function, the base member forms a combination with a detachable support member. With the support member mounted in one position upon the base member, the visual face is oriented for convenience of use when supported upon a horizontal surface and with the support member disposed in another position upon the base member, for convenience of use when mounted upon a vertical surface. For the dual function, the detachable support member is turned through 180° to change the angle of orientation of the base member, and results in the same angle of orientation of the base member either upon the vertical or horizontal surface, but in the opposite sense. Hence, when the base member is held on a vertical surface, it is inclined forwardly with the visual face directed upwards in the general direction of the user's eyes so that the part of the base member which is at the top when on the vertical surface is closest to the vertical surface. However, when on a horizontal surface, the base member is inclined so that the same part of the base member is furthest from the supporting horizontal surface.

This mounting technique is acceptable except when, as in more recent telephone base member designs, a display readout, e.g. an LCD visual information display, is provided. A problem with such display readouts is that the user's eyes need to be directly in front of the readout to enable any information to be read. Unfortunately, a dual function telephone base member does not enable the visual face to be viewed by the user in a direction normal to the plane of the face for both use positions of the base. Hence, if the visual information display is provided directly on the visual face, then in one of the use positions, it becomes unreadable unless the average user moves his head into an unusual and possibly uncomfortable position. To overcome this problem, more recently, visual information displays are provided upon separate display units which are pivotally mounted upon the telephone base members. Hence, in use, the display units may be pivoted relative to the visual face so as to face directly towards the user's eyes in either the horizontal or vertical support positions for the base member. However, this new design presents other problems in that it increases the expense of telephone base members and manufacturing design needs to include the mounting of a display unit upon the base member and in electrically connecting it to the base member. The latter requires an extension from the base member of a cable for connection to the display unit. Undoubtedly, both the display unit and cable are vulnerable. In addition, the cable is required to be flexed each time the display unit is pivoted and such flexing is undesirable in that it adds to the wear of the product.

The present invention seeks to provide a telephone base member and base support member combination which enables the base member to be disposed at different angles of support and which makes it more convenient for the user when the base member is supported either in vertical or in horizontal positions. Hence, a display readout may be provided directly upon the base as part of the visual face while being more convenient to the user for viewing in either the vertical or horizontal positions.

SUMMARY OF THE INVENTION

Accordingly, the present invention provides a telephone base member and a base support member combination comprising: a telephone base member and two base support members; the base member having a support member mounting means for alternatively mountably receiving one or other of the support members in a mounting location upon the base member with a first of the support members, when mounted upon the base member, providing a first angle of support for the base member and with a second of the support members, when mounted upon the base member, providing a second angle of support for the base member; each support member having a mounting structure to enable the support member to be mountably received upon the mounting means of the base member; and the first support member having a carrying structure for mountably receiving the second support member so as to enable the support members to be assembled together with the first support member mounted upon the base member to provide the first angle of support.

Thus, with the combination according to the invention, each of the support members provides a different angle of support for the telephone base member so that the angle of support may be chosen as desired by assembling either of the support members or the assembly thereof to the base member dependent upon the use requirements. Thus, by alternative use of the supports and members, an angle of support of the base member relative to a horizontal support surface may be different from that produced between the base member and a vertical support surface. Also, the directional sense of the angle may be different in the one mounting position as compared to the other. Thus, with the base member supported upon a vertical surface, the visual face may be inclined at an angle of for instance 7° with the top part of the base member lying closest to the wall, whereas when mounted upon a horizontal support surface, the same part of the base member lies furthest from the wall with the visual face inclined at 22° relative to the support surface. Clearly, the desired angle in both cases is a matter of choice and is dependent upon the actual design of the two support members.

It follows, that the combination according to the invention may be assembled together as a single unit for use purposes when the telephone base member is used in one position and one of the support members may be removed from the unit for location of the base member in the other support position.

While the carrying structure of the first support member may mountably receive the second support member in any desired fashion, it is convenient if the mounting structure of the second support member is mountably receivable upon the carrying structure of the first support member in addition to being mountably receivable by the mounting means of the base member.

To assist in correctly mounting each support member upon the base member, it is preferable to have mutually engageable registration means upon each support member and the base member. Conveniently, the base member is formed with a recess with the registration means provided by a base and perimeter surfaces of the recess. In this case the mounting structure of each support member has edge surfaces and a face surface for registration with the perimeter surfaces and the base surface of the recess when correctly located in the mounting position with the mounting structure disposed in the recess. The base surface, perimeter surfaces and corresponding edge and face surfaces may comprise one part of a two part registration means which also comprises at least one projection and projection receiving space with the projection provided by one member and the space defined by the other. To assist with the registration of each support member with the recess, it is preferable for the recess to narrow towards a first end of the recess with the projection or projection receiving space, as the case may be, provided at the first end of the recess. Hence, each support member is mountable upon the base member by moving the support member towards the narrow first end of the recess while mutually engaging the projection with the projection receiving space and causing approach of the edge surfaces of the support member towards the perimeter surfaces of the recess until the support member is disposed in the mounting location with the edge surfaces confronting and being registered with the perimeter surfaces.

Also conveniently, the first support member has a registration means for receiving the registration means of the mounting structure of the second support member to enable the members to be assembled together. The registration means of the support member is preferably in the form of a recess similar to that of the recess in the base member so that registration of the two support members together is achieved in a similar manner to the registration of each support member upon the base member.

Also, to ensure that the two support members may be maintained assembled together even when not attached to the base member, a releasable latch means may be provided which coacts between the two support members.

BRIEF DESCRIPTION OF THE DRAWINGS

One embodiment of the invention will now be described, by way of example, with reference to the accompanying drawings, in which:

FIG. 1 is a diagrammatic side elevational view of a prior art telephone base member and base support member assembly when assembled upon a horizontal support surface;

FIG. 2 is a view similar to FIG. 1 with the prior art assembly mounted upon a vertical surface;

FIG. 3 is an isometric view of a telephone base member and base support member combination according to the embodiment;

FIG. 4 is a side view of the combination according to the embodiment and to a larger scale than FIG. 3;

FIG. 7 is a cross-sectional view through a first support member of the combination taken along line VII—VII in FIG. 5 and on a larger scale than FIG. 5;

FIG. 8 is a cross-sectional view similar to FIG. 7 showing positions of the first and a second support members as they are being assembled together;

FIG. 9 is a view similar to FIG. 7 showing the two support members after assembly;

FIG. 10 is a view in the direction of arrow X in FIG. 9 of the assembly of support members with part of one support member removed for clarity;

DESCRIPTION OF THE PREFERRED EMBODIMENT

Figure 5:
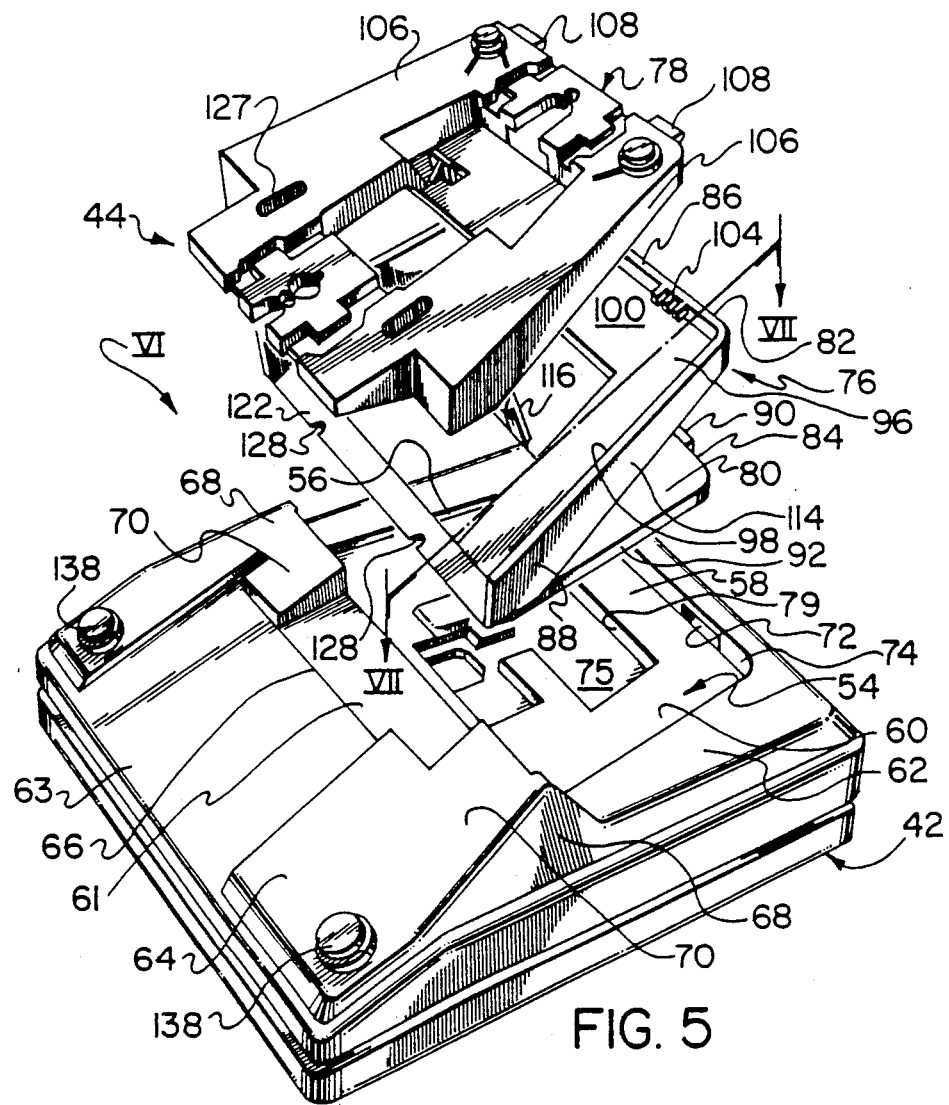
FIG. 5 is an exploded isometric view taken generally in the of arrow V in FIG. 4 of the combination of the embodiment.

FIGS. 1 and 2 illustrate a prior art telephone base member and support member combination 10 assembled in a horizontal position (FIG. 1) such as upon a desk top, and in a vertical position (FIG. 2) such as upon a wall. As can be seen from FIG. 1, the prior art combination 10 comprises a telephone base member 12 having a detachable base support member 14 which is generally of tapered section as shown in FIG. 1. The visual face 16 is inclined to the horizontal and towards the eyes of the user when the assembly 10 is mounted upon a horizontal support surface such as a desk 18 and with the support member 14 located in one of two mounting locations upon the base member. From the visual face 16 extends dialing features of the telephone, such as dialing buttons 20 and the visual face is provided with a conventional mounting arrangement for a telephone handset 22 shown in chain-dotted outline.

The prior art assembly 10 is thus for the dual function of being carried upon a horizontal or upon a vertical support surface. For the purpose of mounting the assembly 10 upon a vertical support surface, the support member 14 is detachable from the base member and is repositioned in its other mounting position at an angle of 180° to the position shown in FIG. 1 and into the position shown in FIG. 2. Hence, as shown in FIG. 2, with the assembly 10 mounted upon a vertical surface such as a wall 24, the support member 14 in its new position, disposes the base member 12 so that the visual face 16 is inclined slightly upwardly in the general direction of the user's face. The top part 26 of the telephone base in FIG. 2 lies closest to the wall 24 whereas, as shown in FIG. 1, the same part 26 of the base is positioned furthest from the horizontal surface of the desk 18. In the two positions, because of the change in orientation of the support member 14 while the angles 28 between the visual face and the support surface are the same in both cases, e.g. 22°, the orientational senses of the angles are opposite.

At both positions of use, it is normally easy for the user to operate the telephone from any viewing angle relative to the plane of the visual face. However, when a visual information display is provided, in cases where such a display is mounted directly into the visual face, it is extremely difficult to read the information in the display unless the user positions his head unnaturally in one of the two positions of the telephone base to view the display directly. To overcome this problem, prior art telephone bases are now being equipped with an LCD visual information display unit such as is indicated at 30 in FIGS. 1 and 2. The display unit 30 extends outwardly from the base member 12 upon a pivotal arm 32. An electrical cable 34 which may be a flat cable, extends from the base member to the unit 30. As shown in FIG. 1, the visual display unit is pivoted into one position with the assembly 10 mounted upon the desk 18 so that the visual face 36 of the display unit faces directly towards the eyes of the user, whereas with the assembly 10 in the vertical position, as shown in FIG. 2, the display unit 30 is pivoted to a different position relative to the base member so that the visual face 36 is still directed towards the eyes of the user. While the construction of the prior art telephone base has certain viewing advantages with the use of the visual display unit, nevertheless, the location of the display unit away from the base member 12 on the arm 32 adds to the design and manufacturing problems and also undesirably adds to the expense of the base member 12. In addition to this, problems have also been encountered in that because the display unit 30 is disposed away from the base member with the outwardly extending arm 32 and the cable 34, any of these items may be more easily damaged than if they were included within the base member structure itself. Vulnerability of these items therefore detracts from this type of design.

As may be seen from the embodiment now to be described, the combination of the various members provides features which enable a visual information display to be located within the confines of a base member while enabling the display to be more easily read by a user with the base member mounted in either horizontal or vertical positions. In addition, even without the use of a visual display, the combination of the various members may be designed so that the angular orientation of a base member upon a horizontal or a vertical support surface is generally more convenient for the viewing angle upon the visual face of the base member.

As shown generally in FIGS. 3 and 4, in the embodiment, a telephone base member and base support member combination 40 comprises a telephone base member 42 and a base support member assembly 44. The base member 42 has a visual face 46 from which extend a group of dialing buttons 48 and which is also provided with a mounting arrangement for a telephone handset 50.

Figure 6:
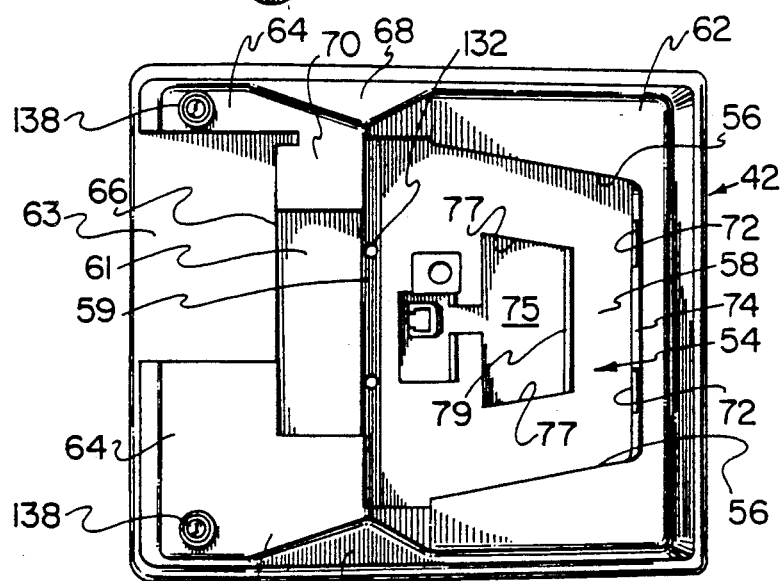
FIG. 6 is a view taken in the direction of arrow VI in FIG. 5 of the base member of the combination.
Figure 11:
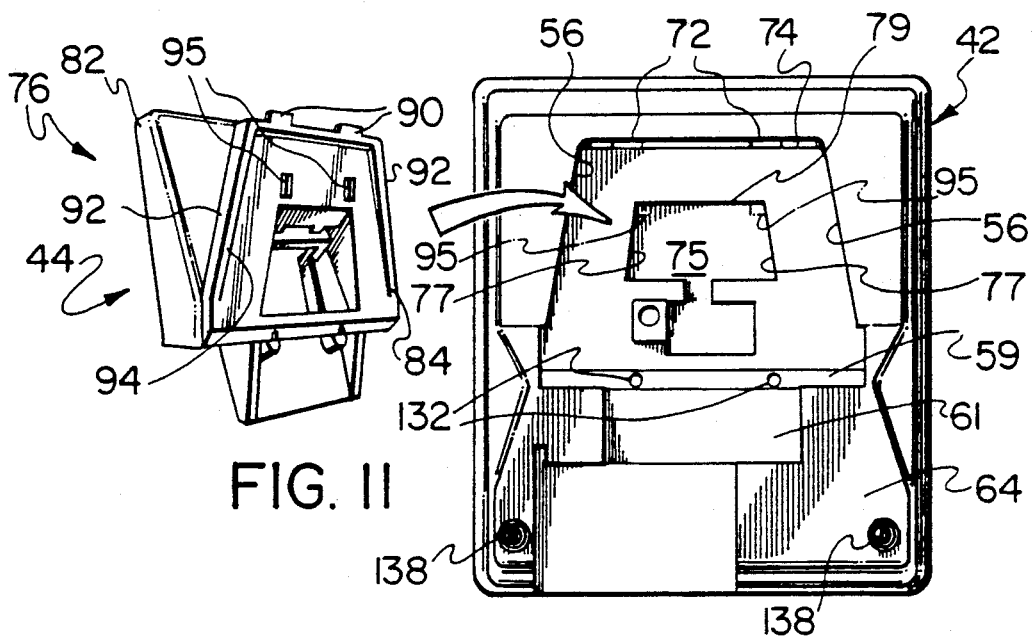
FIG. 11 is a view onto a base surface of the base member and also showing the assembly of support members preparatory to assembly onto the base member.
Figure 12:
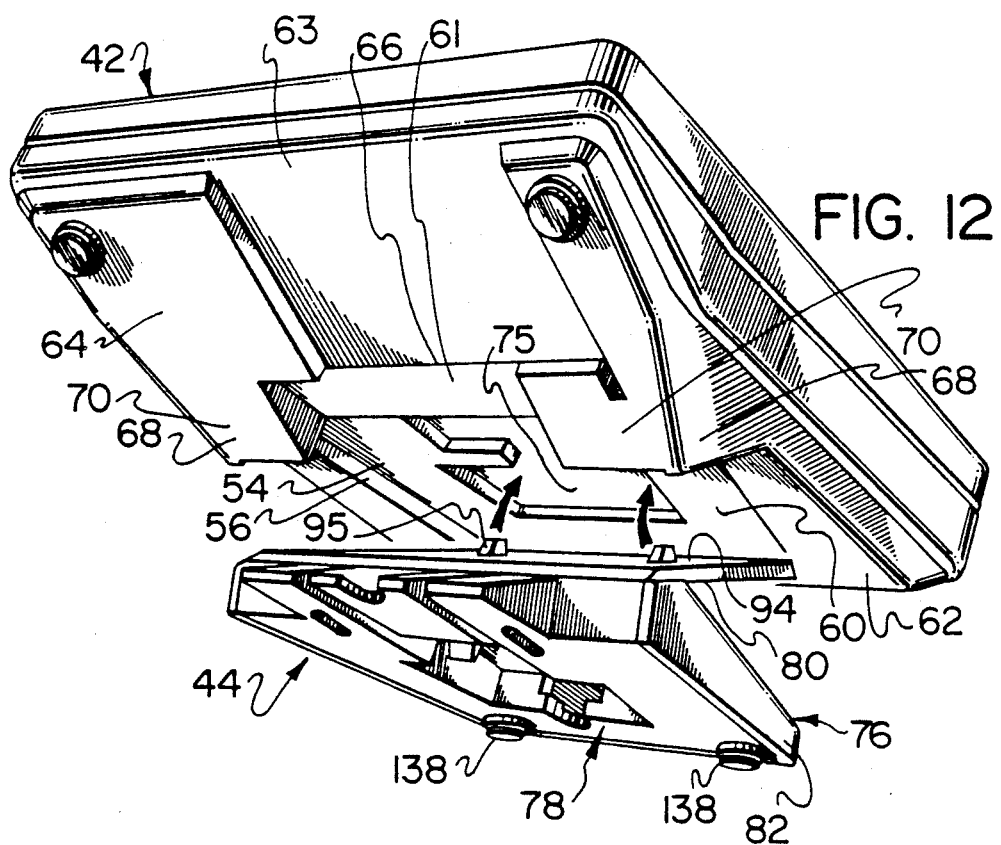
FIG. 12 is an isometric view onto the base surface of the base member during assembly of the support members onto the base member.
Figure 14:
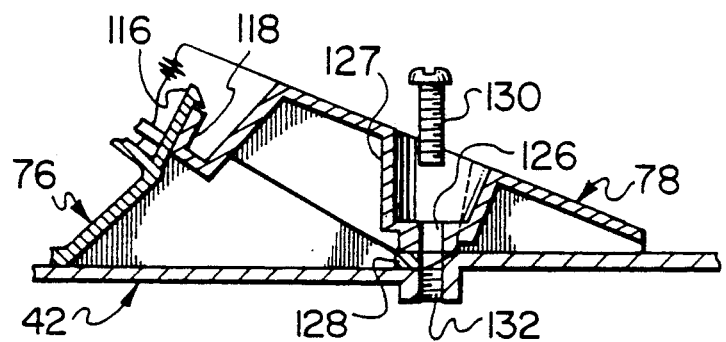
FIG. 14 is a cross-sectional view of part of the total assembly taken along line XIV—XIV in FIG. 13 and to a larger scale.

The support member assembly 44 is assembled onto a rear face of the base member 42. As shown in FIGS. 5 and 6, the base member 42 is provided on its rear face with a support member mounting means shown generally at 54. The support member mounting means comprises a registration means for the support member assembly 44, this registration means comprising opposing side perimeter surfaces 56 and a base surface 58 of a recess 60 formed in a part 62 of the rear face, this part 62 lying substantially parallel with the visual face 46 of the base member 42. As shown more particularly in FIGS. 5 and 12, the base surface part 62 is inclined relative to another base surface part 64. The base surface 58 of the recess has an upwardly inclined step 59 (FIGS. 11 and 14) to a base surface part 61. The base surface part 61 merges with a recessed surface 63 of the base surface part 64 along a junction line 66 which extends between side projections 68 of the base. Each side projection 68 has an undersurface part 70 forming a continuation of the base surface part 64.

The registration means of the base member 42 also includes a part of a mutually engageable projection and projection receiving space arrangement provided between the base member and the support member assembly 44. The projection may be provided either upon the base member or upon the support member assembly dependent upon design convenience. However, in this particular embodiment, two spaced projection receiving spaces 72 are provided at one end of the recess 60 in an end perimeter surface 74 of the recess. As shown clearly in FIGS. 5, 6 and 11 the perimeter surfaces 56 converge towards the end of the recess having the spaces 72 so that the recess 60 is narrower at that end than at the recessed region 75 of recess 60 with side surfaces 77 substantially parallel to side perimeter surfaces 56, and an end surface 79.

The support member assembly 44, as shown in FIGS. 5 and 7 to 11, comprises a first support member 76 and a second support member 78. The first support member 76 comprises two substantially planar portions 80 and 82 which are divergent to free ends 84 and 86 from a junction region 88. The angle of divergence from the junction region 88 determines a first angle of support for the base with the assembly 44 mounted upon the base as will be described.

Figure 13:
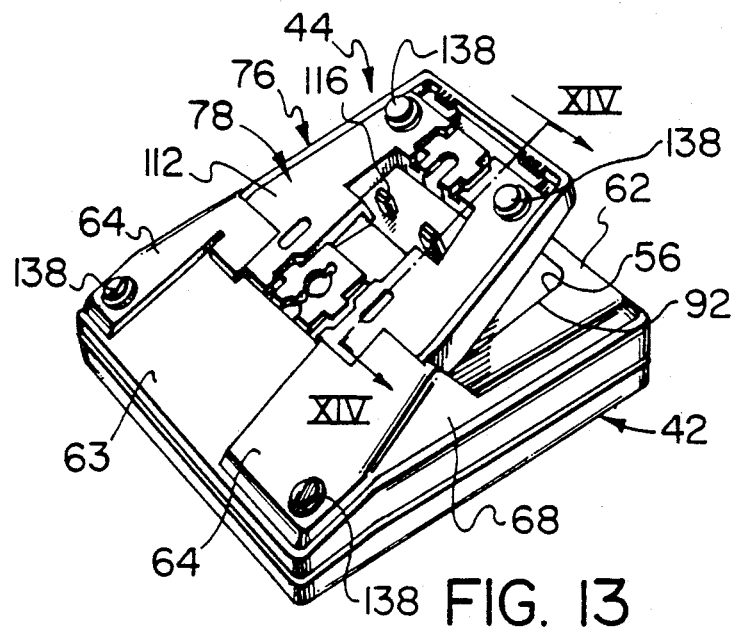
FIG. 13 is an isometric view in the same direction as FIG. 5 and to a smaller scale of the total assembly of base member and support members.

The support member 76 is provided with a mounting structure to enable the support member to be mountably received upon the mounting means of the base member. This mounting structure is provided upon the planar portion 80 and comprises registration means in the form of two spaced projections 90 extending outwardly from the free end 84. The registration means also includes two edge surfaces 92 and an edge face surface 94 on one side of the planar portion 80. The projections 90 are provided for reception within the projection receiving spaces 72 in the recess 60 of the base member 42. The planar portion 80 is shaped so as to fit within the recess 60 with the edge surfaces 92 spaced apart and tapering slightly so as to confront and register with the perimeter surfaces 56 of the recess 60 (see FIG. 13).

It follows that the support member 76 is mountable within the recess 60 by location of the planar portion 80 over the recess and in a slightly tilted fashion (FIG. 12) so that the projections 90 are allowed to move into the projection receiving spaces 72 while the support member 76 is moved upwardly towards the narrow end of the recess. This movement causes the approach of the edge surfaces 92 towards the perimeter surfaces 56 of the recess until, with the support member 76 in its mounting location (FIG. 13), the edge surfaces 92 and the perimeter surfaces 56 confront each other for registration purposes. With the planar portion 80 registered within the recess 60, the edge face surface 94 engages the base surface 58 of the recess. In addition, the first support member 76 includes two registration projections 95 which enter into the deeper recessed region 75 of recess 60 (FIG. 12) so that the projections engage in the corners of the region 75 formed by the junctions of perimeter surfaces 77 and end surface 79. This is shown by the chaindotted outline portions of the projections 95 in FIG. 11.

The other planar portion 82 of the support member 76 is formed with a carrying structure for the second support member 78. This carrying structure provides a registration means for registering the support member 78. As shown particularly in FIGS. 5 and 7, the registration means comprises a base surface 96 and opposing perimeter surfaces 98 of a recess 100 formed in the surface of the planar portion 82 and which faces in the opposite direction from the side surface 94. The recess 100 is substantially of the same size and shape in plan view as the recess 60 of the base member and is also provided with projection receiving spaces 102 defined between the base surface 96 and projections 104 of the planar portion 82. It follows, that the second support member 78 is of the same shape and size in plan view as the planar portion 80 of the support member 76 and has side walls 106 and projections 108 for registration with the perimeter surfaces 98 and the projection receiving recesses 102 respectively of the support member 76. FIG. 10 shows the assembly 44 with the support member 78 partly removed for clarity. Also, the support member 78 has a face surface 110 (FIGS. 8 and 9) for registration with the base surface 96 of the recess 100 when lying within the recess.

Also, the support member 78 is receivable within the recess 60 of the base member 42 (FIG. 15) in a mounting position with the side walls 106 and the face surface 110 registering respectively with the perimeter surfaces 56 and base surface 58 of the recess 60. In addition, the projections 108 (FIG. 16), in the mounting position will be received within the projection receiving spaces 72 of the recess 60. It follows that the support members 76 and 78 may be alternatively mounted in the mounting location of the base member.

As may be seen from FIGS. 5, 8 and 9, the support member 78 is tapered to the end having the projections 108 in that the face surface 110 converges towards an oppositely directed face surface 112 of the member. The angle of convergence of the two face surfaces 110 and 112 is deliberately chosen so that when the support member 78 is mounted directly on the base member (as will be described), and with the base member mounted upon a wall, a second angle of support is provided such that the average telephone user may easily align his view directly with the visual display.

The support member 78 is carried within the recess 100 of the support member 76 in the assembled state of the members with the narrow end of the support member 78 towards the free end 86 of the planar portion 82 (FIGS. 9 and 10). So as to provide a substantial shroud around the sides of the support member 78 and to also produce the perimeter surfaces 98, the planar portion 82 has side walls 114 (FIGS. 5 and 7) which are tapered from the junction region 88 towards the free end 86 with an angle of taper substantially the same as the divergency of the side surfaces 110 and 112.

To enable the support members to be held in assembled condition during mounting upon and detaching from the mounting location upon the base member 42, a releasable latch means is provided upon the two support members. This latch means includes resiliently flexible latches which may be provided upon either member, but, in this particular embodiment, two spaced latches 116 are formed integrally with the support member 76 and extend outwardly from a depressed portion 117 of the base surface 96 and into the recess 100. These latches face, for operation, towards the junction region 88 of the support member 76 so as to receive under each latch, a wall portion 118 (FIGS. 8, 9 and 13) of the support member 78 with the latches received through a latch receiving space 120 of the member 78. The wall portions 118 (one for each latch) and the spaces 120 are formed in the base of a box 121 which is formed in the same direction from face surface 112 as the side walls 106. The box 121 extends beyond the side walls 106 so as to engage two ribs 123 on the depressed portion 117 of the base surface 96 when the two support members 76 and 78 are assembled together with the latches 76 engaging the wall portions 118 (FIG. 10).

The support member 76 has a retaining surface portion 122 for the support member 78 (FIGS. 8 and 9) the retaining surface portion being at the end of the recess 100 at the junction region 88 with the recess 100 opening at the end of the planar portion 82 at the junction region. The retaining surface portion 122, as shown in FIGS. 5, 8 and 9, extends across the width of the planar portion 82 while being inclined relative to the base surface 96 and into the recess 100. The face surface 110 of the support member 78 has an inclined surface portion 124 (FIGS. 9 and 10) extending across the wider end of the support member 78, the angle of inclination between the portion 124 and the face surface 110 being substantially equal to the angle between the retaining surface portion 122 and the base surface 96.

To assemble the two support members 76 and 78 together, the support member 78 is positioned with its face surface 110 facing towards the recess 100 so as to enable the projections 108 to be moved into the projection receiving spaces 102 (FIG. 8). Because of the inclination of the surface portion 122, and the projecting latches 116, the surface 110 is inclined relative to the base surface 96 of the recess 100 as the support member 78 moves into the recess. This is indicated by FIG. 8. However, as the support member 78 moves completely into the recess 100, the face surface 110 moves towards the base surface 96 (the arrow in FIG. 8) until the wall portion 118 moves under the latches 116 to hold the support member 78 down against the base surface 96 (FIG. 9). In this position the portion 124 of the face surface 110 engages and registers with the retaining surface portion 122. It follows that the support member 78 cannot merely be slid outwardly from the recess 100 in the assembled condition because of the resistance to movement provided between the retaining surface portion 122 and the face surface portion 124. For release of the support member 78, resilient releasing movement of the latches 116 is necessary to allow for tilting movement of the support member 78 to bring it away from the retaining surface portion 122.

In the support member assembly 44, the divergency of the face surface 112 from the face surface 110 provides another angle of support for the base member. In this case the face surface 112 provides the supporting surface for the base member both for the total base member and support member combination 40 and for the situation where the support member 78 is mounted directly onto the base member 42 with the support member 76 removed.

The two support members are provided with means for securing the support members in the mounting location of the base member, this securing means enabling the total support member assembly 44 to be secured to the base member or merely the support member 78 to be so secured. The securing means comprises two spaced holes 126 provided in bosses 127 (FIGS. 8, 9 and 14) extending from the support member 76 and two spaced slots 128 (FIG. 5) in the retaining surface portion 122. In the assembly 44, the holes 126 and slots 128 are aligned for the reception of two securing screws 130 (FIG. 14) which pass through the holes and into screwthreaded reception with further aligned holes 132 (FIGS. 6, 11 and 14) in the inclined step 59 of the base member. With the support member 78 disposed in the mounting location with the support member 76 removed, the holes 128 are still aligned with the holes 132 for the reception of the screws 130 as shown in the assembly detail of FIG. 16.

In use of the combination, when a telephone is being supported upon a horizontal surface 134 (see FIG. 4) the two support members 76 and 78 are assembled together as the support member assembly 44 and are mounted in the mounting location of the telephone base. This is the position of FIGS. 3, 4 and 13. In this position, the angle subtended between the side surfaces 94 and 112 is such as to orientate the base member relative to the surface 134 so as to produce a first angle 136 of inclination in the one sense between the visual face 46 of the base member and the support surface 134. This angle 136 is chosen so that the average telephone user may easily align his view directly with the visual display 46. In this embodiment, an angle of about 22° is deemed desirable. As shown, the side surface 112 of member 78 (FIG. 13) forms a substantial continuation of the base surface part 64 of the base member 42 and appropriately located supporting feet 138 are positioned towards the corners of the total support surface 64 and 112 for contact with the surface 134.

Figure 15:
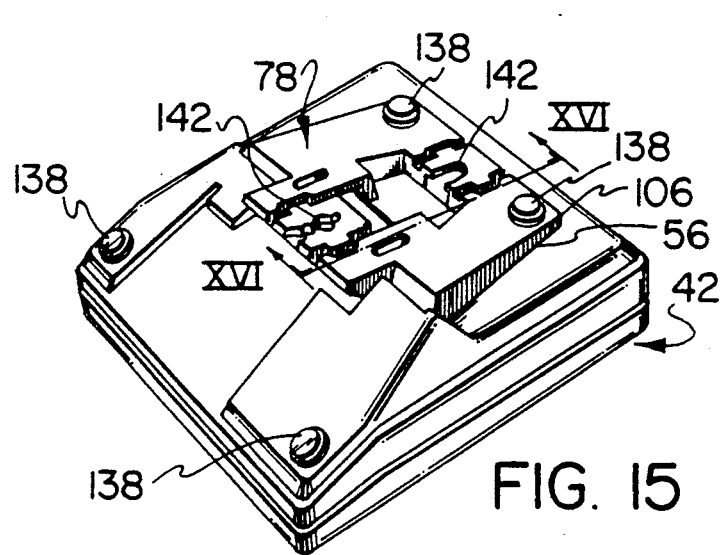
FIG. 15 is an isometric view similar to FIG. 13 of the assembly of base member and one of the support members.
Figure 16:
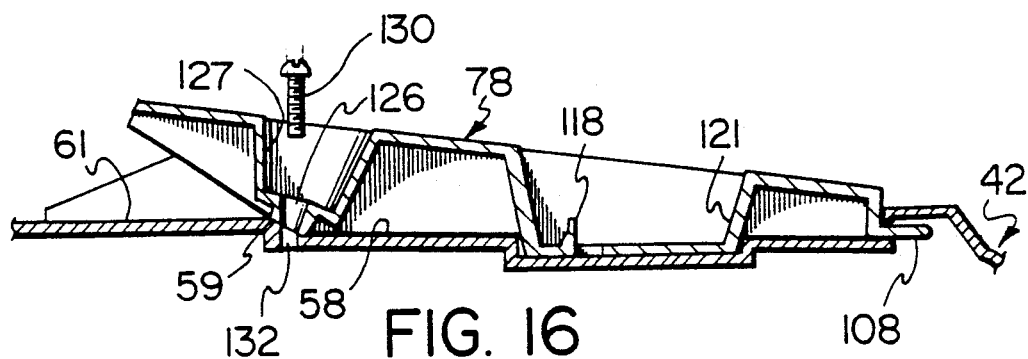
FIG. 16 is a cross-sectional view of part of the assembly of FIG. 15 taken along line XVI—XVI in FIG. 15.
Figure 17:
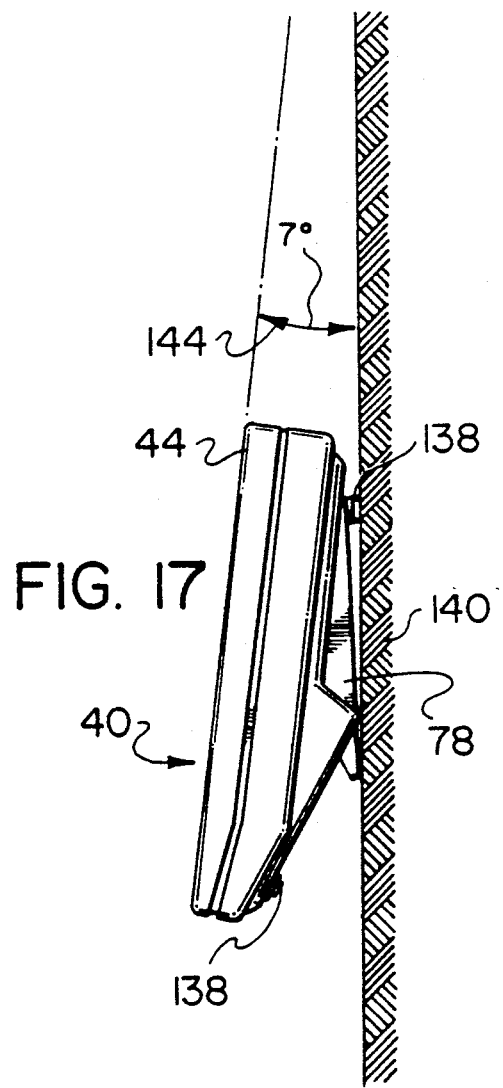
FIG. 17 is a side elevational view of the combination of the embodiment mounted upon a vertical surface.

When it is desired to locate the telephone upon a wall, the assembly 44 is removed from the telephone base member 42 by removing the screws 130 and then sliding the assembly 44 from the recess 60 until the projections 90 have moved from the projection receiving spaces 72. The assembly 44 is then disassembled by releasing the latches 116 from the wall portion 118 of the support member 78. The support member 78 is then inserted into the recess 60, i.e. into its mounting location in the base member (FIG. 16), and the screws 130 are inserted through the aligned holes 126 and 132 to secure the support member in position. This assembly is shown in FIG. 15. It should be noted that the box 121 corresponds substantially to the shape in plan of the deeper recessed region 75 of the recess 60 so as to provide a further positive registration with the base member 42. This assembly is then mounted upon a wall 138 in conventional manner (FIG. 17) by reception of mounting screws (not shown) within conventionally formed screw receiving slots 142 in the surface 112 of the support member 78 (FIG. 15). As may be seen, the angle 144 of inclination of the visual face 46 is both different from and opposite in sense to the angle 136 with the base mounted upon the surface 134. The angle 144 as determined by the face surfaces 110 and 112 is chosen so that the average user may easily view the display directly with the assembly mounted upon the wall.

The invention, as illustrated by the above embodiments, is useful in that it enables different angles and opposite senses of angles to be chosen between the visual face of a telephone base member and a support surface dependent upon whether that support surface is vertical or horizontal. Thus, dependent upon the angles chosen, the visual face may be disposed in either location so as to be more easily viewed by an average user in either location. More particularly, the invention provides an arrangement in which when a telephone base member includes a visual display extending from the visual face as in the embodiment described, the average user may easily align his view directly with the visual display. This avoids the necessity in the design of the base member for the visual display to form part of a separate unit which is mounted outwardly from and is movable upon the base member.

What is claimed is:

1. A telephone base member and base support member combination comprising:

a telephone base member, a first support member and a second support member, the first support member having a carrying structure for mountably receiving the second support member so as to form a support member assembly;

each support member having a mounting structure and the base member having a support member mounting means for alternatively mountably receiving:

(a) the mounting structure of the first support member so as to mount the support member assembly upon the base member with the support member assembly providing a first angle of support for the base member; and (b) the mounting structure of the second support member so as to mount the second support member alone upon the base member and provide a second angle of support for the base member;

and each mounting structure and the support member mounting means including mutually engageable registration means wherein the registration means on the base member comprises a base and perimeter surfaces of a recess of the base member and a projection receiving space at a first end region of the recess towards which the perimeter surfaces converge, and wherein, on each support member, the registration means comprises edge and face surfaces of the support member and a projection at an edge of the support member; each support member being mountable within the recess of the base member by moving the support member into the recess and towards the first end region of the recess while mutually engaging the projection within the projection receiving space and causing approach of the edge surfaces of the support member towards the perimeter surfaces of the recess until the support member is disposed with the edge regions confronting and being registered with the perimeter surfaces.

2. A combination according to claim 1 wherein a part of each support member defines a hole which, with the support member mounted upon the base member is aligned with a hole formed in the base member for acceptance of a securing screw.

3. A combination according to claim 2 wherein, in the support member assembly, the holes of the support members are aligned with each other and also with the hole formed in the base member for acceptance of the securing screw.

4. A combination according to claim 1 wherein the first support member comprises two substantially planar portions which are divergent towards free ends from a junction region of the first support member, the angle of divergence determining the first angle of support for the base member, one of the planar portions comprising the mounting structure of the first support member and the other planar portion comprising the carrying structure.

5. A telephone base member and base support member combination comprising:

a telephone base member, a first support member and a second support member, the first support member having a carrying structure for mountably receiving the second support member so as to form a support member assembly;

each support member having a mounting structure and the base member having a support member mounting means for alternatively mountably receiving:

(a) the mounting structure of the first support member so as to mount the support member assembly upon the base member with the support member assembly providing a first angle of support for the base member; and (b) the mounting structure of the second support member so as to mount the second support member alone upon the base member and provide a second angle of support for the base member;

the support member mounting means of the base member having a registration means comprising a base surface and perimeter surfaces of a recess in the base member, and the mounting structure of each support member having a registration means comprising edge surfaces and a face surface of the support member, each support member when mounted upon the base member being entered into the recess and having its face surface and edge surfaces registered, respectively, with the base surface and perimeter surfaces of the recess; and the carrying structure of the first support member also comprising a registration means provided by a base surface and perimeter surfaces of a further recess formed in the first support member, and in the support member assembly, the second support member is entered into the further recess with its face surface and edge surfaces registered, respectively, with the base surface and perimeter surfaces of the further recess.

6. A combination according to claim 5 wherein the first and second support members are provided with a releasable latch means for retaining the support members in the support member assembly.

7. A combination according to claim 6 wherein the base surface of the further recess has a retaining surface portion engageable by the face surface of the second support member and the latch means is releasably engageable as the second support member is moved into the further recess so as to hold the second support member against the retaining surface portion to hold the support members assembled together until release of the latch means.

8. A combination according to claim 5 wherein the fist support member comprises two substantially planar portions which are divergent towards free ends from a junction region of the first support member, the angle of divergence determining the first angle of support for the base member, one of the planar portions comprising the mounting structure of the first support member and being formed with the edge and face surfaces of that mounting structure and the other planar portion comprising the carrying structure and formed with the further recess, the face surface and further recess of the first support member facing in directions opposite to each other from the first support member.

9. A combination according to either claim 1 or claim 5 wherein, the carrying structure of the first support member has a registration means for receiving the registration means of the mounting structure of the second support member in the support member assembly.

* * * * *